(12) United States Patent
Uchizumi

(10) Patent No.: US 10,397,111 B2
(45) Date of Patent: Aug. 27, 2019

(54) COMMUNICATION DEVICE, COMMUNICATION SYSTEM, AND COMMUNICATION METHOD

(71) Applicant: ALAXALA Networks Corporation, Kawasaki-shi, Kanagawa (JP)

(72) Inventor: Keigo Uchizumi, Kawasaki (JP)

(73) Assignee: Alaxala Networks Corporation, Kanagawa (JP)

( * ) Notice: Subject to any disclaimer, the term of this patent is extended or adjusted under 35 U.S.C. 154(b) by 0 days.

(21) Appl. No.: 15/846,531

(22) Filed: Dec. 19, 2017

(65) Prior Publication Data

US 2018/0234339 A1 Aug. 16, 2018

(30) Foreign Application Priority Data

Feb. 15, 2017 (JP) ................................. 2017-026039

(51) Int. Cl.
*H04L 12/741* (2013.01)
*H04L 29/12* (2006.01)

(52) U.S. Cl.
CPC ............ *H04L 45/74* (2013.01); *H04L 61/103* (2013.01); *H04L 61/2015* (2013.01); *H04L 61/6022* (2013.01)

(58) Field of Classification Search
CPC ....... H04L 12/66; H04L 12/70; H04L 12/741; H04L 45/74; H04L 61/10; H04L 61/20; H04L 61/60; H04L 61/103; H04L 61/2007; H04L 61/2015; H04L 61/6009; H04L 61/6013; H04L 61/6018; H04L 61/6022; G06F 13/00
See application file for complete search history.

(56) References Cited

U.S. PATENT DOCUMENTS

| 7,474,660 B1 * | 1/2009 | Pearce | H04L 12/4625 370/395.3 |
| 8,125,993 B2 * | 2/2012 | Arberg | H04L 29/12273 370/392 |
| 8,154,999 B2 * | 4/2012 | Tsuge | H04L 12/2856 370/230 |
| 8,490,156 B2 * | 7/2013 | Huber | G06Q 20/1235 726/2 |
| 8,625,423 B2 * | 1/2014 | Yano | H04L 45/00 370/230.1 |
| 8,688,834 B2 * | 4/2014 | Fujimoto | H04L 61/2015 709/222 |

(Continued)

FOREIGN PATENT DOCUMENTS

| JP | 2007-036374 A | 2/2007 |
| JP | 2015-050767 A | 3/2015 |

(Continued)

*Primary Examiner* — Tri H Phan
(74) *Attorney, Agent, or Firm* — Mattingly & Malur, PC

(57) ABSTRACT

A packet relay device automatically generates a whitelist including an authorized communication rule. The packet relay device snoops on communications between a DHCP server and a DHCP client in accordance with DHCP. When the IP address of a DHCP client is changed, the packet relay device also automatically changes IP address information included in a whitelist related to the DHCP client to IP address information newly allocated to the DHCP client.

8 Claims, 12 Drawing Sheets

(56) References Cited

U.S. PATENT DOCUMENTS

| | | | |
|---|---|---|---|
| 8,763,082 B2* | 6/2014 | Huber | G06Q 20/1235 |
| | | | 726/3 |
| 9,155,022 B2* | 10/2015 | Huber | G06Q 20/1235 |
| 10,218,671 B2* | 2/2019 | Pang | H04L 61/2061 |
| 2006/0059092 A1* | 3/2006 | Burshan | H04L 29/06 |
| | | | 705/51 |
| 2007/0022211 A1 | 1/2007 | Shimizu et al. | |
| 2009/0286544 A1* | 11/2009 | Huber | G06Q 20/1235 |
| | | | 455/450 |
| 2015/0067764 A1 | 3/2015 | Kim et al. | |
| 2015/0373027 A1* | 12/2015 | Gupta | H04L 61/6022 |
| | | | 726/4 |
| 2016/0088666 A1* | 3/2016 | Paterour | H04W 48/16 |
| | | | 370/329 |
| 2017/0063861 A1 | 3/2017 | Uchizumi et al. | |

FOREIGN PATENT DOCUMENTS

| | | |
|---|---|---|
| JP | 2017-046149 A | 3/2017 |
| WO | 2017/073089 A1 | 5/2017 |

* cited by examiner

FIG. 2

| | 801 | 802 | 803 | 804 | 805 | 806 | 807 | 808 | 809 | 810 | 811 | 812 | 813 |
|---|---|---|---|---|---|---|---|---|---|---|---|---|---|
| 1 | PACKET RECEIVER NUMBER | VLAN NUMBER | Source Mac Address | Destination Mac Address | protocol | Source IP Address | Destination IP Address | SOURCE PORT NUMBER | DESTINATION PORT NUMBER | Valid bit | Source Mac Address | Valid bit | Destination Mac Address |
| 2 | PACKET RECEIVER NUMBER | VLAN NUMBER | Source Mac Address | Destination Mac Address | protocol | Source IP Address | Destination IP Address | SOURCE PORT NUMBER | DESTINATION PORT NUMBER | Valid bit | Source Mac Address | Valid bit | Destination Mac Address |
| ... | | | | | | | | | | | | | |
| n | PACKET RECEIVER NUMBER | VLAN NUMBER | Source Mac Address | Destination Mac Address | protocol | Source IP Address | Destination IP Address | SOURCE PORT NUMBER | DESTINATION PORT NUMBER | Valid bit | Source Mac Address | Valid bit | Destination Mac Address |

| STORED INFORMATION | STORED CONTENT | INITIAL STATE | |
|---|---|---|---|
| WHITELISTING FUNCTION STATE | GENERATING STATE/ OPERATING STATE | OPERATING STATE | ~504 |

| 1201 | 1202 | 1203 |
|---|---|---|
| INSTRUCTION TYPE | SET CONTENT | INITIAL STATE |
| WHITELISTING FUNCTION STATE SETTING | GENERATING STATE/ OPERATING STATE | OPERATING STATE |

~1204

COMMUNICATION DEVICE, COMMUNICATION SYSTEM, AND COMMUNICATION METHOD

BACKGROUND

The present invention relates to a communication device, a communication system, and a communication method.

Recently, measures are needed to prevent situations in which an attacker intrudes into the network of a critical infrastructure, such as a power plant, to take control of the systems of the infrastructure. The network of the critical infrastructure is protected by firewall devices and anti-virus software installed on terminals such as personal computers. In order to prevent the intrusion of attackers who intend to take over system control, stronger measures are needed. An example of a scheme that mitigates risks when an attacker intrudes into systems, there is a method that uses communication devices enabling whitelisting functions. The whitelisting function enabled by the communication device is a function that improves security level by registering information about authorized terminals included in authorized communications carried in networks on the communication device that can store whitelists and blocking unauthorized communications sent from terminals that are not authorized and not registered on the communication device that can store the whitelists.

Regarding the background art of the present technique, there are Japanese Unexamined Patent Application Publication No. 2015-050767, Japanese Unexamined Patent Application Publication No. 2017-46149, and International Publication WO 2017073089.

Japanese Unexamined Patent Application Publication No. 2015-050767 describes a whitelist-based network switch. The whitelist-based network switch includes a whitelist monitoring unit for storing a whitelist including authorized communication rules, monitoring one or more packets input through a plurality of switch interfaces based on the whitelist, and permitting communication of each packet conforming to the whitelist, and a whitelist management unit for updating the whitelist and transmitting an updated whitelist to the whitelist monitoring unit (See Abstract).

Japanese Unexamined Patent Application Publication No. 2017-46149 describes a communication apparatus. The communication apparatus receives control information of first data and a plurality of types of header information of first data, the first data being received by a first data receiver; the apparatus selects a parameter from the plurality of types of header information of the first data based on a priority of a first data receiver group to which the first data receiver belongs and a storage condition, the priority being indicated by priority information, the storage condition indicating the number of entries of a whitelist that can be stored in a whitelist storage first memory; and the apparatus adds, to the whitelist, an entry that includes control information of the first data and at least one parameter selected above (See Abstract).

International Publication WO 2017073089 describes a communication device, a system, and a method. A packet relay device is provided with packet reception units, a packet transfer unit, an S/W controller, packet transmission units, and an input-output interface, and a whitelist including authorized communication rules is automatically generated. For each data reception unit that receives data, it is possible to select controlling communication using the whitelist, or implementing data communication without using the white list (See Abstract).

On the other hand, Japanese Unexamined Patent Application Publication No. 2007-36374 introduces a security technique for networks using the Dynamic Host Configuration Protocol (hereinafter, DHCP). Japanese Unexamined Patent Application Publication No. 2007-36374 describes a packet transfer device, a communication network, and a packet transfer method. The packet transfer device has a plurality of ports, a protocol processing unit, and a controller. The packet transfer device transfers an Internet Protocol (IP) address allocation request sent from a client terminal in accordance with DHCP to a DHCP server, and receives an application for IP address allocation. In the transfer and reception, the packet transfer device stores information, which is an IP address and a Media Access Control (MAC) address, about the client terminal on the storage unit. The packet transfer device also stores information, which is an IP address and a MAC address extracted from an ARP packet, about the client terminal on the storage unit through an Address Resolution Protocol (ARP) resolution by the client terminal or through an ARP resolution by the packet transfer device. When the IP address of the stored DHCP packet is matched with the IP address of the stored ARP packet, the packet transfer device filters the port for the client terminal that has transmitted the ARP packet (See Abstract).

SUMMARY OF THE INVENTION

As described in Japanese Unexamined Patent Application Publication No. 2015-050767, Japanese Unexamined Patent Application Publication No. 2017-46149, and International Publication WO 2017073089, a whitelist is preset by an administrator, whereas a whitelist is automatically generated based on communication contents. Both cases have a premise that the parameters of the whitelist once generated are not changed. Because of this premise, it seems to be difficult to adapt whitelists for networks, for example, in which the IP addresses of terminals are dynamically changed using DHCP.

From the configuration described in Japanese Unexamined Patent Application Publication No. 2007-36374, when an unauthorized terminal is connected to a network that allocates IP addresses using DHCP, communications can be interrupted by blocking the port of the transfer device. However, the configuration fails to control communications by capturing a suspicious behavior of an authorized terminal unlike whitelisting functions.

In view of the above circumstances, it is an object of the present invention to improve security achieved by whitelisting functions in networks in which IP addresses of terminals are dynamically changed.

A first aspect of the present invention is to provide a communication device including a protocol information table configured to store a MAC address, an IP address, and expiration time of the IP address in corresponding relation to one another, a whitelist storing memory configured to store a whitelist including a MAC address and an IP address, and a processing unit. The processing unit extracts a client MAC address, a client IP address, and client expiration time of the client IP address from a communication content for establishing or for connecting communications between a server and a client in accordance with a protocol to dynamically allocate an IP address. When searching the protocol information table for a MAC address based on the client MAC address to retrieve an entry, the processing unit updates an IP address and expiration time in the retrieved entry with the client IP address and the client expiration time, and when retrieving no entry, generates a new entry including the client MAC address, the client IP address, and the client expiration time. The processing unit searches the whitelist storing memory for a MAC address based on the client MAC address, and updates an IP address in a retrieved entry with the client IP address.

According to a second aspect of the present invention is to provide a communication system including a communication device and a server configured to dynamically allocate an IP address to a client. The communication device includes a protocol information table configured to store a MAC address, an IP address, and expiration time of the IP address in corresponding relation to one another, a whitelist storing memory configured to store a whitelist including a MAC address and an IP address, and a processing unit. The processing unit extracts a client MAC address, a client IP address, and client expiration time of the client IP address from a communication content for establishing or for connecting communications between a server and a client in accordance with a protocol to dynamically allocate an IP address. When searching the protocol information table for a MAC address based on the client MAC address to retrieve an entry, the processing unit updates an IP address and expiration time in the retrieved entry with the client IP address and the client expiration time, and when retrieving no entry, generates a new entry including the client MAC address, the client IP address, and the client expiration time. The processing unit searches the whitelist storing memory for a MAC address based on the client MAC address, and updates an IP address in a retrieved entry with the client IP address.

According to a third aspect of the present invention is to provide a communication method for a communication device. The communication device includes a protocol information table configured to store a MAC address, an IP address, and expiration time of the IP address in corresponding relation to one another, a whitelist storing memory configured to store a whitelist including a MAC address and an IP address, and a processing unit. The processing unit extracts a client MAC address, a client IP address, and client expiration time of the client IP address from a communication content for establishing or for connecting communications between a server and a client in accordance with a protocol to dynamically allocate an IP address. When searching the protocol information table for a MAC address based on the client MAC address to retrieve an entry, the processing unit updates an IP address and expiration time in the retrieved entry with the client IP address and the client expiration time, and when retrieving no entry, generates a new entry including the client MAC address, the client IP address, and the client expiration time. The processing unit searches the whitelist storing memory for a MAC address based on the client MAC address, and updates an IP address in a retrieved entry with the client IP address.

According to the aspects of the present invention, security achieved by whitelisting functions is improved in networks in which IP addresses of terminals are dynamically changed.

BRIEF DESCRIPTION OF THE DRAWINGS

FIG. 2 is a diagram of an example of a whitelist and examples of pieces of information in a whitelist storing memory according to the embodiment;

FIG. 4 is a diagram of examples of pieces of setting information stored on a transfer setting memory according to the embodiment;

FIG. 6-1 is a flowchart of the operation according to the embodiment in receiving a DHCP ACK packet at a packet transfer unit of the packet relay device;

FIG. 6-2 is a flowchart of the operation according to the embodiment in receiving DHCP information from the packet transfer unit at a DHCP information change reflection program of the packet relay device to add and rewrite information in the DHCP information table;

FIG. 6-3 is a flowchart of the operation according to the embodiment in receiving DHCP information from the packet transfer unit at the DHCP information change reflection program of the packet relay device to rewrite whitelist information in the whitelist storing memory;

FIG. 7-1 is a flowchart of the operation according to the embodiment in receiving a DHCP RELEASE packet at the packet transfer unit of the packet relay device;

FIG. 7-2 is a flowchart of the operation according to the embodiment in receiving DHCP information from the packet transfer unit at the DHCP information change reflection program of the packet relay device to remove information in the DHCP information table;

FIG. 7-3 is a flowchart of the operation according to the embodiment in receiving DHCP information from the packet transfer unit at the DHCP information change reflection program of the packet relay device to rewrite whitelist information in the whitelist storing memory; and FIG. 8 illustrates an exemplary instruction according to the embodiment transmitted from an input-output device to the packet relay device.

DETAILED DESCRIPTION OF THE PREFERRED EMBODIMENT (Overview)

An embodiment of the present invention is to provide a communication device configured to control communications based on a whitelist, for example. The communication device includes a database configured to store a combination of the IP address and the MAC address of a terminal that is a DHCP client and the expiration time (in the following, a lease timer) of the IP address based on DHCP communications sent and received between the DHCP client and a DHCP server. When an entry on the database storing a combination of an IP address and a MAC address and a lease timer is changed, a whitelist set on the communication device is searched, while a MAC address stored on the entry is used as a key. When an entry is hit, the IP address of the hit entry set on the whitelist is modified to the IP address stored on the changed entry on the database. Thus, this configuration provides whitelisting functions coping with dynamic address change in accordance with DHCP.

An embodiment of the present invention provides communication control of a certain terminal using a whitelist generated by a communication device in networks with a dynamic allocation of IP addresses using DHCP, for example, even though the IP address of this certain terminal is dynamically changed.

(Communication Device and System)

Figure 1:
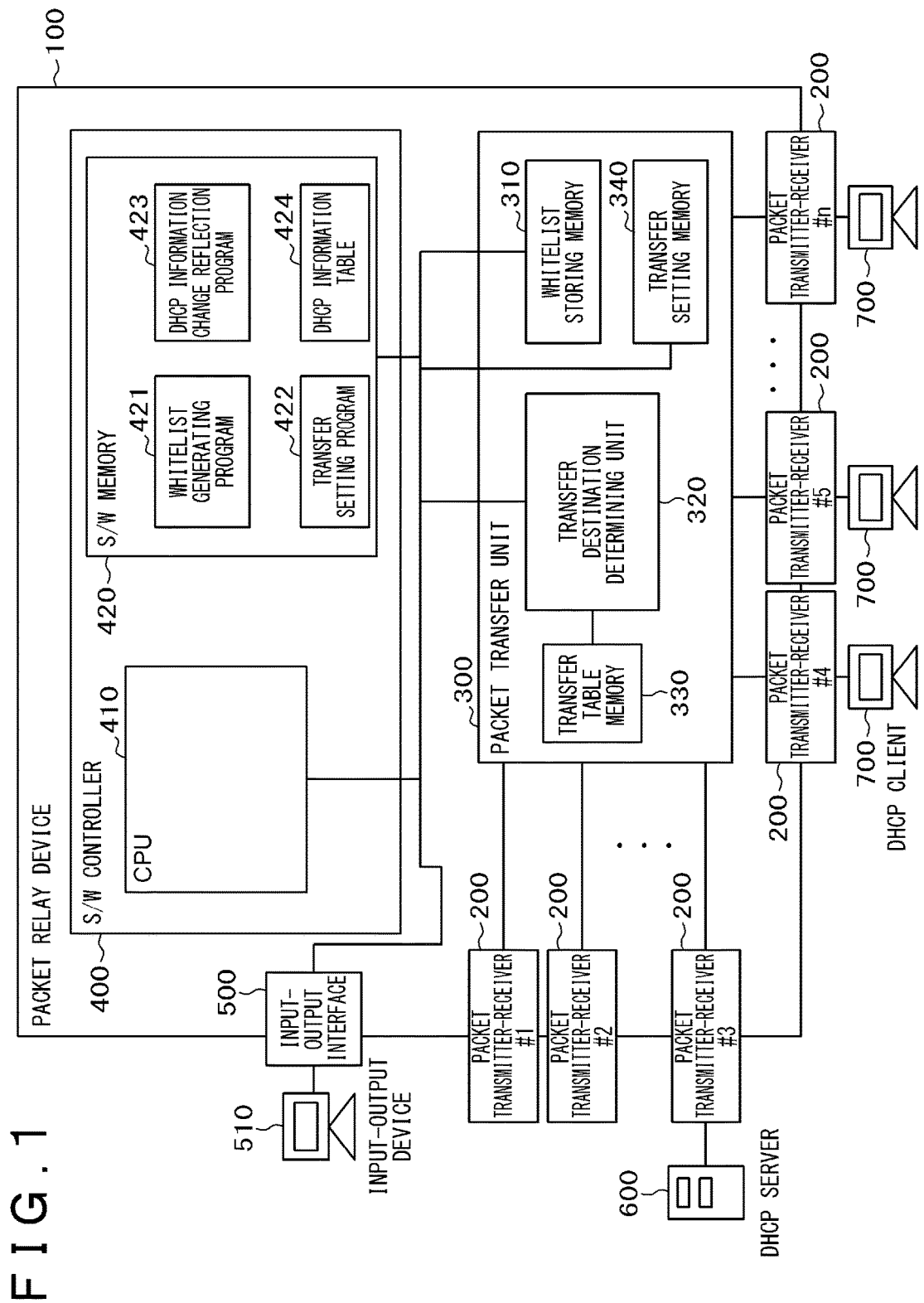
FIG. 1 is a block diagram illustrating exemplary configurations of a packet relay device according to an embodiment and a DHCP server and DHCP clients connected to the packet relay device.

FIG. 1 illustrates exemplary configurations of a packet relay device to relay packets that are examples of data, and a DHCP server and DHCP clients that are connected to the packet relay device. A packet relay device 100 is an example of a communication device. The packet relay device 100 relays packets, generates a whitelist, generates and modifies a DHCP information table based on DHCP communications between the DHCP server and the DHCP clients, and modifies the whitelist in association with a change in the DHCP information table, for example. The term "whitelist" means a list of packets whose transfer is permitted by the packet relay device 100. Note that DHCP is defined in, but not limited to, Request for Comments (RFC) 2131, for example.

The packet relay device 100 includes a plurality of packet transmitter-receivers 200, a packet transfer unit 300, a software (S/W) controller 400, and an input-output interface 500, for example.

The packet transmitter-receivers 200 are connected to external devices, including terminals, another packet relay device, and any other device, for example, through cable links, such as metal cables and optical cables, or through wireless links. The packet transmitter-receivers 200 receive packets from the connected external devices, and transmit the received packets to the connected external devices. The packet transmitter-receivers 200 individually have transmitter-receiver numbers to uniquely identify the packet transmitter-receivers 200.

When receiving packets, the packet transmitter-receivers 200 add control information to the packets that correspond to the packet transmitter-receivers 200 having received the packets. The control information includes, for example, a packet transmitter-receiver number for the packet transmitter-receiver 200 and a VLAN number that is the identifier of a Virtual Local Area Network (VLAN) to which the packet transmitter-receiver 200 belongs.

The packet transfer unit 300 receives a packet from the packet receiver 200, for example, and transfers, discards, or subjects the received packet to any other processing in accordance with a whitelist generated at the S/W controller 400. The S/W controller 400 generates a whitelist, generates and changes a DHCP information table in accordance with DHCP communications sent and received between the DHCP server and the DHCP client, and modifies the whitelist in association with a change in the DHCP information table, for example.

To the input-output interface 500, an input-output device 510 is connected. The input-output interface 500 accepts an input from a user through the input-output device 510. The input-output interface 500 outputs the result of executing a program and any other data to the input-output device 510. The input-output device 510 includes, for example, an input device, such as a keyboard and a mouse, to accept an input from the user, and an output device, such as a display device and a printer, to output the result processed by the packet relay device 100 in a visually recognizable form by the user.

Note that FIG. 1 illustrates the input-output device 510 as a device independent of the packet relay device 100. However, a configuration may be provided in which the packet relay device 100 is equipped with an input-output device 510, such as manipulation buttons.

A DHCP server 600 is a server that allocates IP addresses to clients in accordance with DHCP. The DHCP server 600 is connected to the packet relay device 100 through the packet transmitter-receiver 200.

DHCP clients 700 are terminals that are provided with IP-address-allocation services in accordance with DHCP. The DHCP clients 700 are connected to the packet relay device 100 through the packet transmitter-receivers 200. Note that the packet transmitter-receivers 200 to which the DHCP clients 700 are connected are supposed to have transmitter-receiver numbers different from the transmitter-receiver number of the packet transmitter-receiver 200 to which the DHCP server 600 is connected.

The packet transfer unit 300 includes a whitelist storing memory 310, a transfer destination determining unit 320, a transfer table memory 330, and a transfer setting memory 340.

The whitelist storing memory 310 is a Content Addressable Memory (CAM), a Dynamic Random Access Memory (DRAM), and any other memory, for example, and stores a whitelist generated by the S/W controller 400.

The transfer table memory 330 is a CAM, a DRAM, and any other memory, for example, and stores information indicating the correspondence of header information about a packet with the transfer destination of the packet, i.e. the packet transmitter-receiver 200. This information is generated by an administrator and any other operator, and stored in advance on the transfer table memory 330. The MAC address table used for communications in accordance with the Open Systems Interconnection (OSI) reference model layer 2 and the routing table used for communications in accordance with the OSI reference model layer 3 are examples of pieces of information indicating the correspondence.

The transfer setting memory 340 is a DRAM and any other memory, for example, and stores setting information such as the mode and the state of the packet relay device 100 to be described later, operations in the reception of packets sent from devices that are not registered on the whitelist, and any other information. The setting information stored on the transfer setting memory 340 is set by the administrator and any other operator through the input-output device 510.

The transfer destination determining unit 320 receives a packet from the packet transmitter-receiver 200, searches the transfer table memory 330 while using the header information of the received packet as a key, and then determines the transfer destination of the received packet.

When receiving a packet in a whitelist operating state to be described later, the transfer destination determining unit 320 searches the whitelist stored on the whitelist storing memory 310. When determining that the received packet is a packet that is not registered on the whitelist, the transfer destination determining unit 320 discards the packet.

When receiving a packet in a whitelist generating state to be described later, the transfer destination determining unit 320 extracts a predetermined piece of header information and a predetermined piece of control information from the received packet, and transmits the pieces of information to the S/W controller 400. The transfer destination determining unit 320 determines whether to perform communications using the whitelist in accordance with the set content on the transfer setting memory 340 and any other determination. When receiving a DHCP ACK packet or a DHCP RELEASE packet to be described later, the transfer destination determining unit 320 extracts information about the DHCP client 700 from the packet, and transmits the information to the S/W controller 400.

The packet transfer unit 300 can typically be configured of hardware in order to execute simple instructions at high speed, such as high-speed whitelist search and communications at the packet wire rate. The packet transfer unit 300 may be configured of a Field Programmable Gate Array (FPGA) and any other integrated circuit, for example. Note that the packet transfer unit 300 may be configured of software.

The S/W controller 400 includes a Central Processing Unit (CPU) 410 and a S/W memory 420. The CPU 410 includes a processor that executes programs stored on the S/W memory 420. The S/W memory 420 can include a Read Only Memory (ROM) that is a non-volatile memory and a Random Access Memory (RAM) that is a volatile memory. The ROM stores a non-volatile program (e.g. Basic input-output System (BIOS)) and any other program. The RAM is a high-speed, volatile memory like a DRAM. The RAM temporarily stores programs executed by the processor and data used in executing the programs.

The S/W memory 420 includes a whitelist generating program 421, a transfer setting program 422, a DHCP information change reflection program 423, and a DHCP information table 424.

The programs stored on the S/W memory 420 execute given processes using a strange device, a communication port (communication device), and any other device, while the CPU 410 (processor) executes the programs. Thus, in the embodiment, the description given by the program that is used as the subject of the sentence may be the description given by the CPU 410 that is used as the subject of the sentence. Alternatively, processes executed by the programs are processes run by a computer and a computer system on which the programs operate.

The CPU 410 operates as a functional unit that implements predetermined functions while operating in accordance with the programs. The CPU 410 operates in accordance with the whitelist generating program 421, for example, to function as a whitelist generating unit. The CPU 410 operates in accordance with the transfer setting program 422 to function as a transfer setting unit. The CPU 410 operates in accordance with the DHCP information change reflection program 423 to function as a DHCP information change reflecting unit. The DHCP information change reflection program 423 generates and changes information in the DHCP information table 424. The CPU 410 also operates as a functional unit that implements a plurality of processes executed by the programs. Note that the S/W controller 400 (specifically the CPU 410) and the packet transfer unit 300 (specifically the transfer destination determining unit 320) can be referred to as processing units.

The whitelist generating program 421 generates a whitelist based on control information and header information received from the transfer destination determining unit 320, and writes these pieces of information on the whitelist storing memory 310.

The transfer setting program 422 writes transfer settings inputted from the input-output device 610 on the transfer setting memory 340.

The DHCP information change reflection program 423 extracts, from DHCP communications between the DHCP server 600 and the DHCP client 700, the combination of an IP address allocated to the DHCP client 700 by the DHCP server 600 and a MAC address of the DHCP client 700, and a lease timer for the IP address. The DHCP information change reflection program 423 searches the DHCP information table 424 while using the MAC address of the DHCP client 700 as a key. When the DHCP information table 424 has no entry having the MAC address of the DHCP client 700, the DHCP information change reflection program 423 generates a new entry on the DHCP information table 424, and stores the generated information on the new entry. When the DHCP information table 424 already has the entry having the MAC address of the DHCP client 700, the DHCP information change reflection program 423 updates the DHCP information table 424 to have information including the extracted IP address information and the extracted lease timer.

Note that the remaining time of the lease timer is decreased from the timing at which the information is stored. At the timing at which the remaining time expires to zero, an entry removal process to be described later is performed.

After updating the DHCP information table 424, the DHCP information change reflection program 423 searches the whitelist storing memory 310. In the case where the DHCP information change reflection program 423 finds an entry related to the MAC address of the DHCP client 700 on the whitelist, the DHCP information change reflection program 423 modifies IP address information stored on the entry to the IP address allocated to the DHCP client 700.

Figures 1, 6:
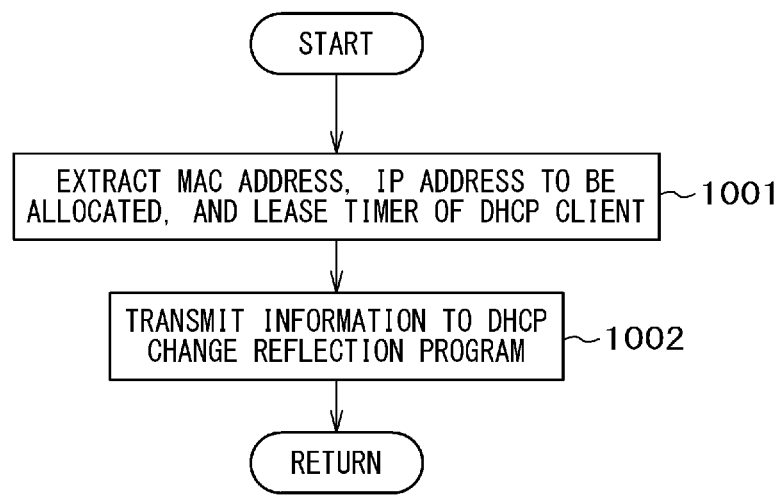
Figures 2, 6:
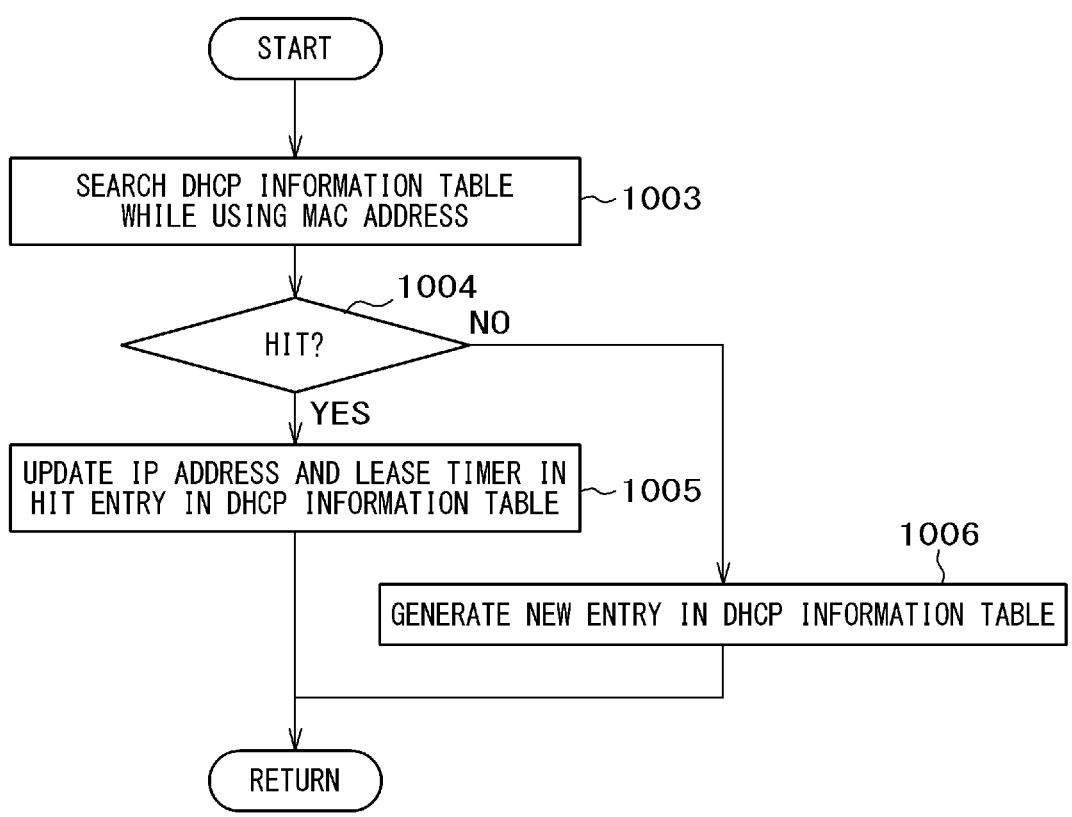
Figures 3, 6:
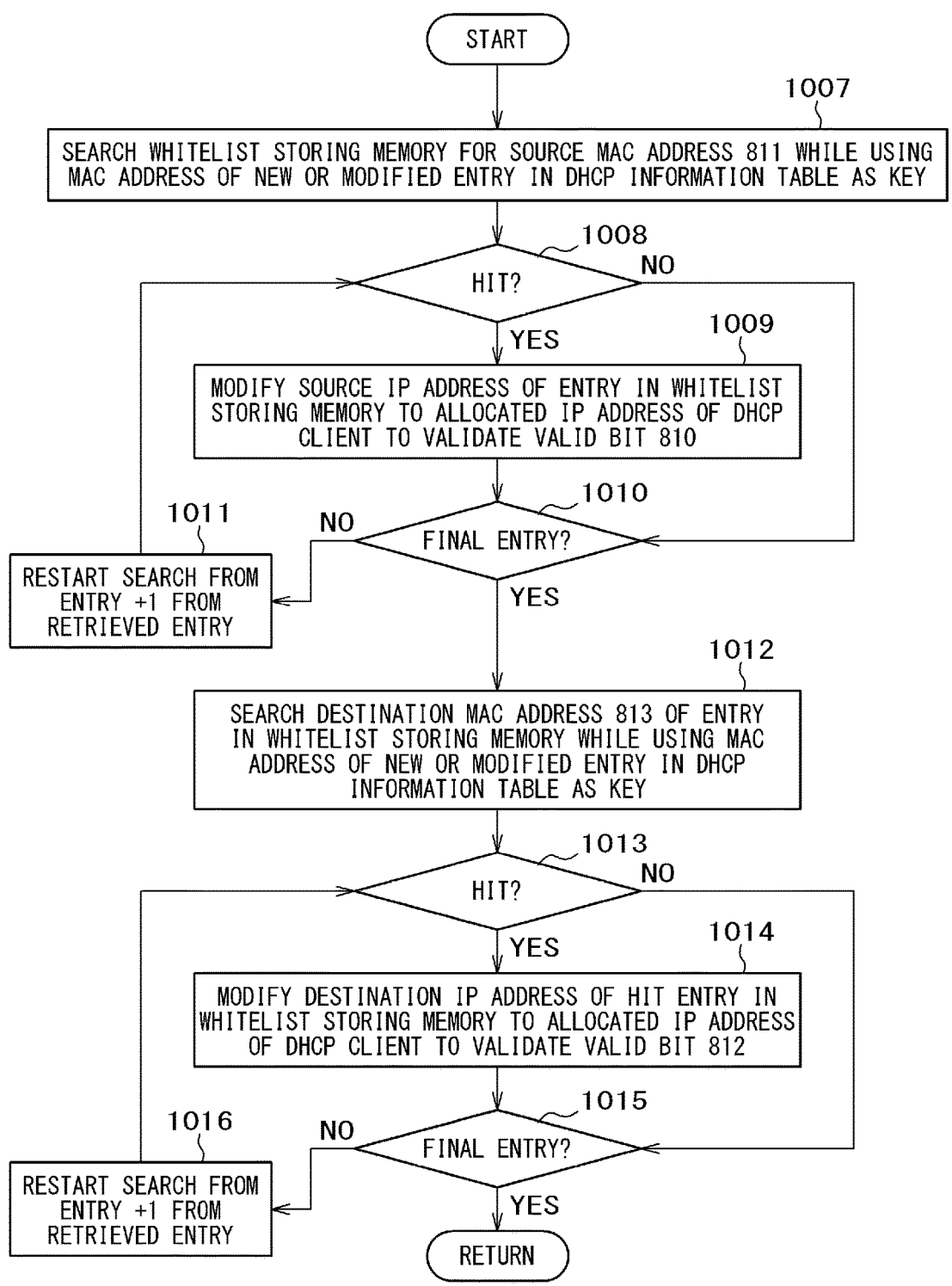

FIG. 2 illustrates an exemplary whitelist stored on the whitelist storing memory 310. In the example in FIG. 2, the whitelist includes n entries. The entries in the whitelist each include a plurality of parameters. The plurality of parameters is control information or header information. The transfer destination determining unit 320 extracts these pieces of information from the packet received from the packet transmitter-receiver 200.

An entry 800 is an exemplary entry included in the whitelist. The entry 800 includes a packet receiver number 801 and a VLAN number 802. These numbers are parameters that indicate control information about a packet, for example. The entry 800 includes a Source MAC Address 803, a Destination MAC Address 804, a protocol 805, a Source IP Address 806, a Destination IP Address 807, a Source port number 808, and a Destination port number 809, for example. These pieces of information are parameters that indicate header information about the packet.

The packet transmitter-receiver number 801 is the number that uniquely identifies each packet transmitter-receiver 200. The packet transmitter-receiver 200 having received a packet is identified based on the packet transmitter-receiver number 801. The VLAN number 802 is the number that uniquely identifies a VLAN to which the packet transmitter-receiver 200 belongs.

The Source MAC Address 803 indicates the source MAC address of the packet. The Destination MAC Address 804 indicates the destination MAC address of the packet. The protocol 805 indicates a protocol type. The Source IP Address 806 indicates the source IP address of the packet. The Destination IP Address 807 indicates the destination IP address of the packet. The Source port number 808 indicates the source port number of the packet. The Destination port number 809 indicates the destination port number of the packet.

The entry 800 includes a Source MAC Address 811 and a Destination MAC Address 813. These MAC Addresses are used as keys when the DHCP information change reflection program 423 searches the whitelist storing memory 310, in addition to examples (the parameters 801 to 809), which are used as parameters when the transfer destination determining unit 320 searches the whitelist. The Source MAC Address 811 is information similar to the Source MAC Address 803. The Destination MAC Address 813 is information similar to the Destination MAC Address 804. The entry 800 includes Valid bits 810 and 812. In the case where the DHCP information change reflection program 423 removes information about the MAC address, the entry 800 includes the Valid bits 810 and 812 to invalidate a whitelist related to this MAC address. The Valid bit 810 is used to determine whether the Source MAC Address 811 is valid or invalid. The Valid bit 812 is used to determine whether the Destination MAC Address 813 is valid or invalid.

Note that the entry 800 only has to include at least one type of parameter indicating control information and a plurality of types of parameters indicating header information including the Source IP Address 806 and the Destination IP Address 807, but not limited to the examples of the parameters 801 to 809 in FIG. 2. In addition to or instead of the parameters indicating the header information, for example, the entry 800 may include pieces of header information, such as a Type Of Service (TOS) field, a flag field, a Time To Live (TTL) field, an ID field, a version field, and a header value field.

The entry 800 according to the embodiment is supposed to have to hold pieces of information from the parameters 810 to 813.

Figure 3:
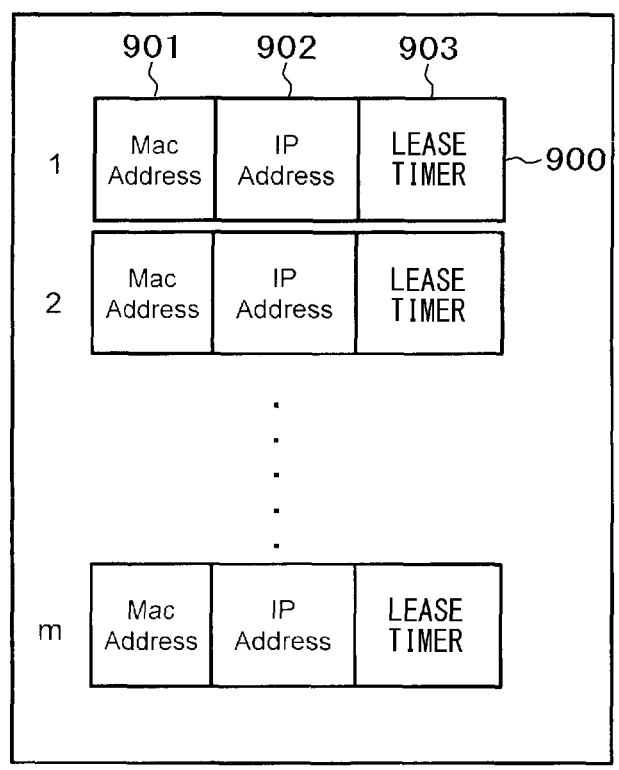
FIG. 3 is a diagram of an example of a DHCP information table according to the embodiment.

FIG. 3 illustrates examples of pieces of information stored on the DHCP information table 424. In the examples in FIG. 3, the DHCP information table 424 includes m entries. The entries in the DHCP information table 424 each include a plurality of parameters. The plurality of parameters is information extracted from a DHCP ACK packet received from the DHCP server 600 at the transfer destination determining unit 320 through the packet transmitter-receiver 200. The DHCP ACK packet includes the MAC address of the DHCP client 700 to which an IP address is allocated, the IP address to be allocated to the DHCP client 700, and a lease timer for the IP address. Note that the lease timer is information preset to the DHCP ACK packet when the DHCP server 600 sends the DHCP ACK packet. The entry 900 is an exemplary entry included in the DHCP information table 423. A MAC Address 901 is the MAC address of the DHCP client 700 to which the IP address included in the DHCP ACK packet is allocated. An IP Address 902 is the IP address, which is included in the DHCP ACK packet, to be allocated to the DHCP client 700. A lease timer 903 stores the expiration time of the IP address.

FIG. 4 illustrates examples of pieces of transfer setting information stored on the transfer setting memory 340. The transfer setting information includes, for example, stored information 501 to indicate the type of transfer setting, a stored content 502 to indicate the state of the stored information 501, and an initial state 503 to indicate the initial state of the stored content 502. In FIG. 4, a plurality of values separated by "/" is described in the cell indicating the stored content 502. However, in the actual configuration, any one of the plurality of values is stored. The initial state 503 stores any one of the plurality of values described in the corresponding stored content 502.

In the following, an example of the outline of the operation of the packet relay device 100 in accordance with the transfer setting information will be described. When receiving a packet, the transfer destination determining unit 320 determines whether the stored content 502 on the record 504 is a generating state to generate a whitelist or an operating state to control communications in accordance with a whitelist.

In the following, an exemplary operation will be described in the case where the stored content 502 on the record 504 is the generating state. In the case where a packet received from the packet transmitter-receiver 200 is a packet other than a DHCP packet, the transfer destination determining unit 320 transmits a predetermined piece of header information and a predetermined piece of control information about the received packet to the whitelist generating program 421, while performing the transfer of the packet similarly to a typical packet relay device. The whitelist generating program 421 extracts the parameters of the whitelist from the header information and the control information (the parameters 801 to 809) received from the transfer destination determining unit 320, and also extracts control information (the parameters 811 and 813) for searching the whitelist storing memory 310 by the DHCP information change reflection program 423. The whitelist generating program 421 generates values indicating a valid state to be written on the Valid bits 810 and 812. The whitelist generating program 421 then writes the extracted and generated pieces of information on the whitelist storing memory 310.

Note that, in the case where a packet received at the transfer destination determining unit 320 is a packet related to DHCP, the same operation is performed regardless of the stored content 502 on the record 504, and hence the case will be described later.

In the following, an exemplary operation will be described in the case where the stored content 502 on the record 504 is the operating state. In the case where a packet received from the packet transmitter-receiver 200 is a packet other than a DHCP packet, the transfer destination determining unit 320 determines whether packet information about the packet is already registered on the whitelist stored on the whitelist storing memory 310. In the case where the packet information is already registered, the transfer destination determining unit 320 also determines whether the Valid bits 810 and 812 on the entry of the packet are valid or invalid. In the case where the packet information about the packet is already registered on the whitelist and the Valid bits 810 and 812 on the entry of the packet are valid, the transfer destination determining unit 320 transfers the received packet similarly to a typical packet relay device.

In the case where the packet information about the packet is not registered on the whitelist or in the case where the packet information about the packet is already registered but any one of the Valid bits 810 and 812 is invalid, the transfer destination determining unit 320 discards the packet.

Figure 5:
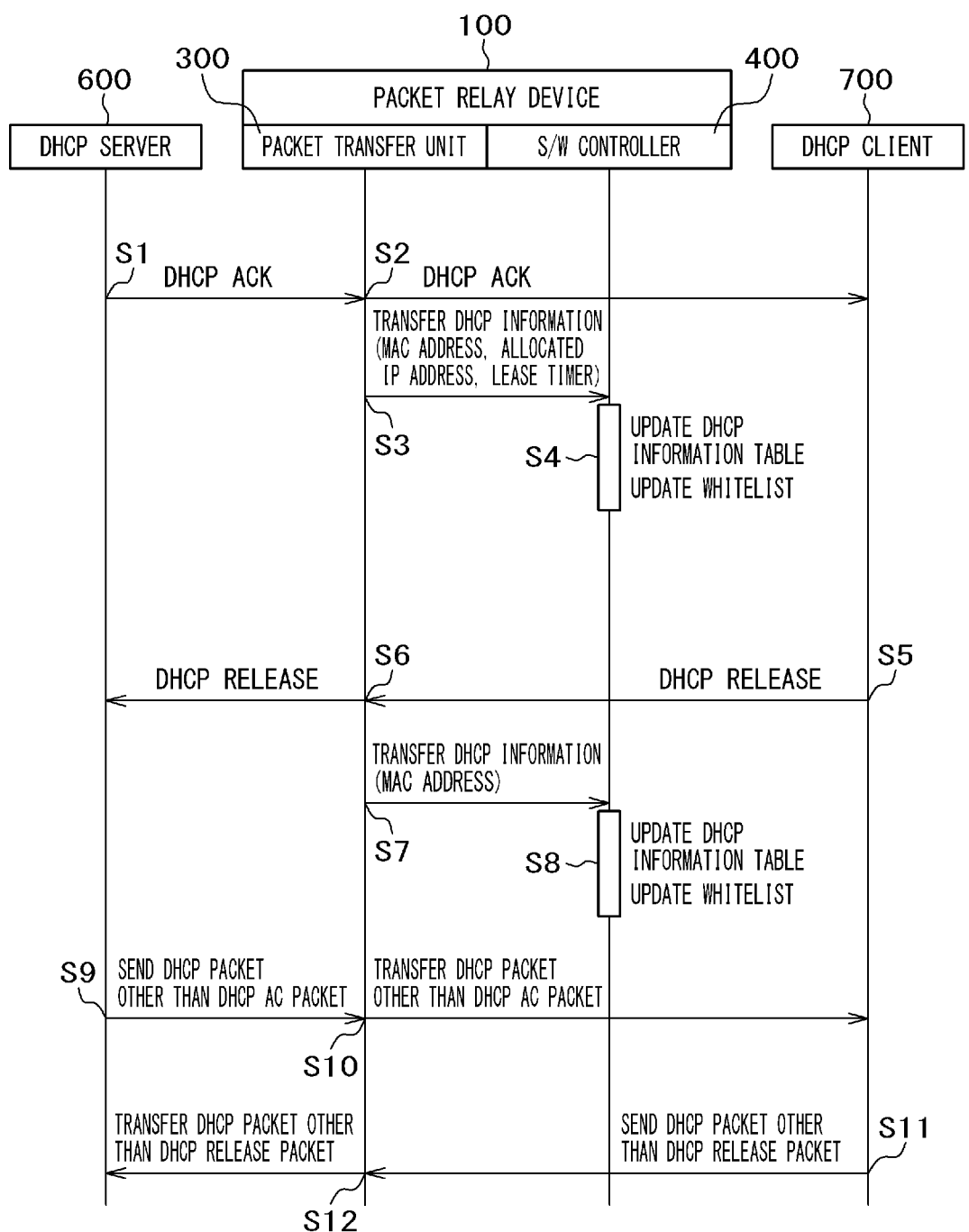
FIG. 5 is an illustration of the operation performed in the packet relay device to relay packets between a DHCP server and a DHCP client in communications using DHCP.

FIG. 5 is an illustration of the operation according to the embodiment performed in the packet relay device 100 to relay packets between the DHCP server 600 and the DHCP client 700 in communications using DHCP. Note that the operation in receiving a DHCP ACK packet and the operation in receiving a DHCP RELEASE packet in FIG. 5 will be described in detail separately in FIGS. 6-1 to 6-3 and FIGS. 7-1 to 7-3.

In Step S1, the DHCP server 600 sends a DHCP ACK packet, and the packet relay device 100 receives the DHCP ACK packet. In Step S2, the packet transfer unit 300 transfers the packet. In Step S3, the packet transfer unit 300 extracts the MAC address of the DHCP client 700, an IP address allocated to the DHCP client 700, and a lease timer stored in the DHCP ACK packet, and transmits the extracted DHCP information to the S/W controller 400. After receiving the DHCP information, in Step S4, the S/W controller 400 updates the DHCP information table and the whitelist.

In Step S5, the DHCP client 700 sends a DHCP RELEASE packet, and the packet relay device 100 receives the DHCP RELEASE packet. In Step S6, the packet transfer unit 300 transfers the packet. In Step S7, the packet transfer unit 300 extracts the MAC address of the DHCP client 700 stored in the DHCP RELEASE packet, and transmits the extracted MAC address to the S/W controller 400. After receiving the DHCP information, in Step S8, the S/W controller 400 updates the DHCP information table and the whitelist.

In Step S9, the DHCP server 600 sends DHCP packets other than the DHCP ACK packet, and the packet relay device 100 receives the packets. In Step S10, the packet transfer unit 300 transfers the packets.

In Step S11, the DHCP client 700 sends DHCP packets other than the DHCP RELEASE packet, and the packet relay device 100 receives the packets. In Step S12, the packet transfer unit 300 transfers the packets.

As described above, the DHCP packets are transferred, which are regarded as packets not to be searched for on the whitelist or not to be discarded.

In the following, the operation in receiving a DHCP ACK packet will be described. Note that the operation is to be performed in a sequential order from FIGS. 6-1 to 6-3 as described below.

FIG. 6-1 is a flowchart of the operation according to the embodiment in receiving a DHCP ACK packet at the packet transfer unit 300 of the packet relay device 100. In Step 1001, the transfer destination determining unit 320 extracts the MAC address of the DHCP client 700, an IP address allocated to the DHCP client 700, and a lease timer, which are stored as information in the DHCP ACK packet. After extracting the information, in Step 1002, the transfer destination determining unit 320 transmits the extracted information (e.g. DHCP information) to the DHCP information change reflection program 423.

FIG. 6-2 is a flowchart of the operation according to the embodiment in which the DHCP information change reflection program 423 of the packet relay device 100 receives the DHCP information from the packet transfer unit 300, and adds and rewrites information in the DHCP information table 424. In Step 1003, the DHCP information change reflection program 423 searches the DHCP information table 424, while using the MAC address of the DHCP client 700 as a key. In Step 1004, in the case where the DHCP information change reflection program 423 retrieves a hit entry as a search result, the process goes to Step 1005. The DHCP information change reflection program 423 updates the IP address allocated to the DHCP client 700 and the lease timer of the hit entry in the DHCP information table 424.

In the case where the DHCP information change reflection program 423 retrieves no hit entry in Step 1004, this means that information about the MAC address is absent in the DHCP information table 424. In Step 1006, the DHCP information change reflection program 423 generates a new entry in the DHCP information table 424, and stores the DHCP information transmitted from the packet transfer unit 300 on the entry.

FIG. 6-3 is a flowchart of the operation according to the embodiment in which the DHCP information change reflection program 423 of the packet relay device 100 receives the DHCP information from the packet transfer unit 300, and rewrites whitelist information in the whitelist storing memory 310.

In Step 1007, the DHCP information change reflection program 423 searches the whitelist storing memory 310 for an entry having a value matched with the value in the Source MAC Address 811 field, while using the MAC address of the DHCP client 700 as a key. In Step 1008, in the case where the DHCP information change reflection program 423 retrieves a hit entry from the entries that have been searched for, the process goes to Step 1009. The DHCP information change reflection program 423 rewrites a value in the Source IP Address 806 field to the value of the IP address allocated to the DHCP client 700, and stores a value indicating being valid on the Valid bit 810 field. The process then goes to Step 1010. Also in the case of retrieving no hit entry in Step 1008, the process goes to Step 1010. In Step 1010, the DHCP information change reflection program 423 determines whether the entry retrieved in Step 1008 is the final entry in the whitelist storing memory 310. In the case where the DHCP information change reflection program 423 determines that the retrieved entry is not the final entry in Step 1010, the process goes to Step 1011. The DHCP information change reflection program 423 searches the whitelist storing memory 310 from the subsequent entry in the whitelist storing memory 310, and the process returns to Step 1008. In the case where the retrieved entry is the final entry in Step 1010, this means that the DHCP information change reflection program 423 has finished its searches on all the entries in the whitelist storing memory 310, and the process goes to Step 1012.

In Step 1012, the DHCP information change reflection program 423 searches the whitelist storing memory 310 for an entry having a value matched with the value in the Destination MAC Address 813 field, while using the MAC address of the DHCP client 700 as a key. In Step 1013, in the case where the DHCP information change reflection program 423 retrieves a hit entry from the entries that have been searched for, the process goes to Step 1014. The DHCP information change reflection program 423 rewrites the value in the Destination IP Address 807 field of the hit entry to the value of the IP address allocated to the DHCP client 700. The DHCP information change reflection program 423 stores a value indicating being valid on the Valid bit 812 field, and the process goes to Step 1015. Also in the case of retrieving no hit entry in Step 1013, the process goes to Step 1015. In Step 1015, the DHCP information change reflection program 423 determines whether the entry retrieved in Step 1013 is the final entry in the whitelist storing memory 310. In the case where the DHCP information change reflection program 423 determines that the retrieved entry is not the final entry in Step 1015, the process goes to Step 1016. The DHCP information change reflection program 423 searches the whitelist storing memory 310 from the subsequent entry, and the process returns to Step 1013. In the case where the retrieved entry is the final entry in Step 1015, this means that the DHCP information change reflection program 423 has finished its searches on all the entries in the whitelist storing memory 310, and the DHCP information change reflection program 423 ends the modifying process.

The DHCP information change reflection program 423 repeats Steps 1009 and 1014 to also follow IP address information registered as the whitelist information in the case where the IP address of the DHCP client 700 is changed. The operation above provides the application of the whitelist also to networks in which IP addresses are dynamically changed.

In the following, the operation in receiving a DHCP RELEASE packet will be described. Note that the operation is to be performed in a sequential order from FIGS. 7-1 to 7-3 as described below.

Figures 1, 7:
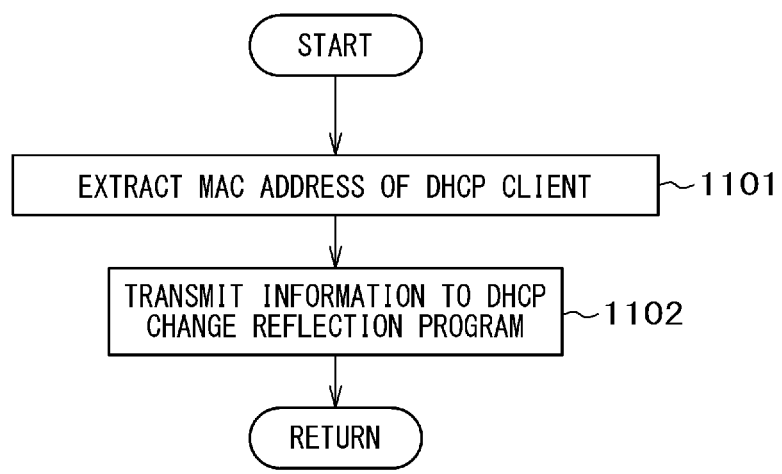
Figures 2, 7:
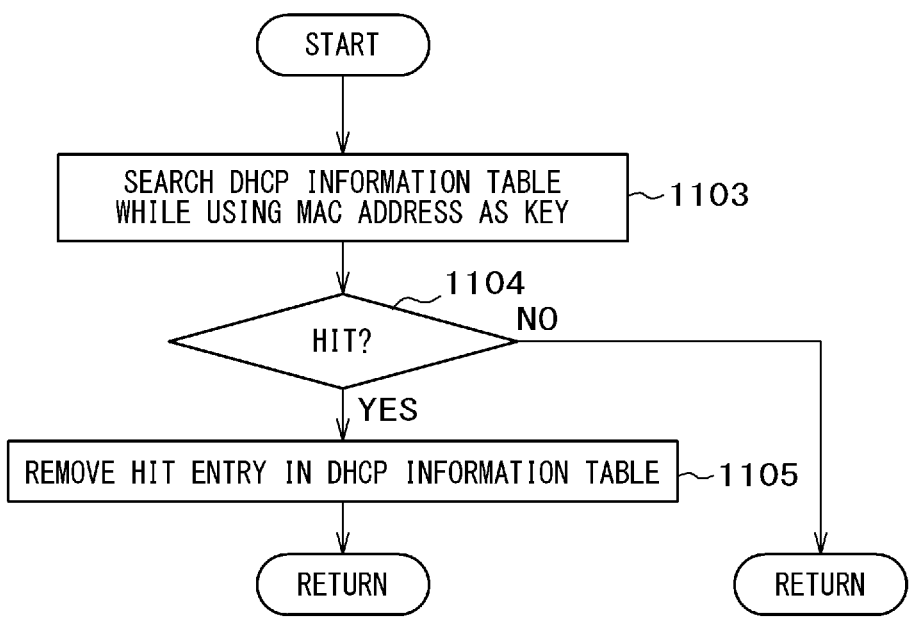
Figures 3, 7:
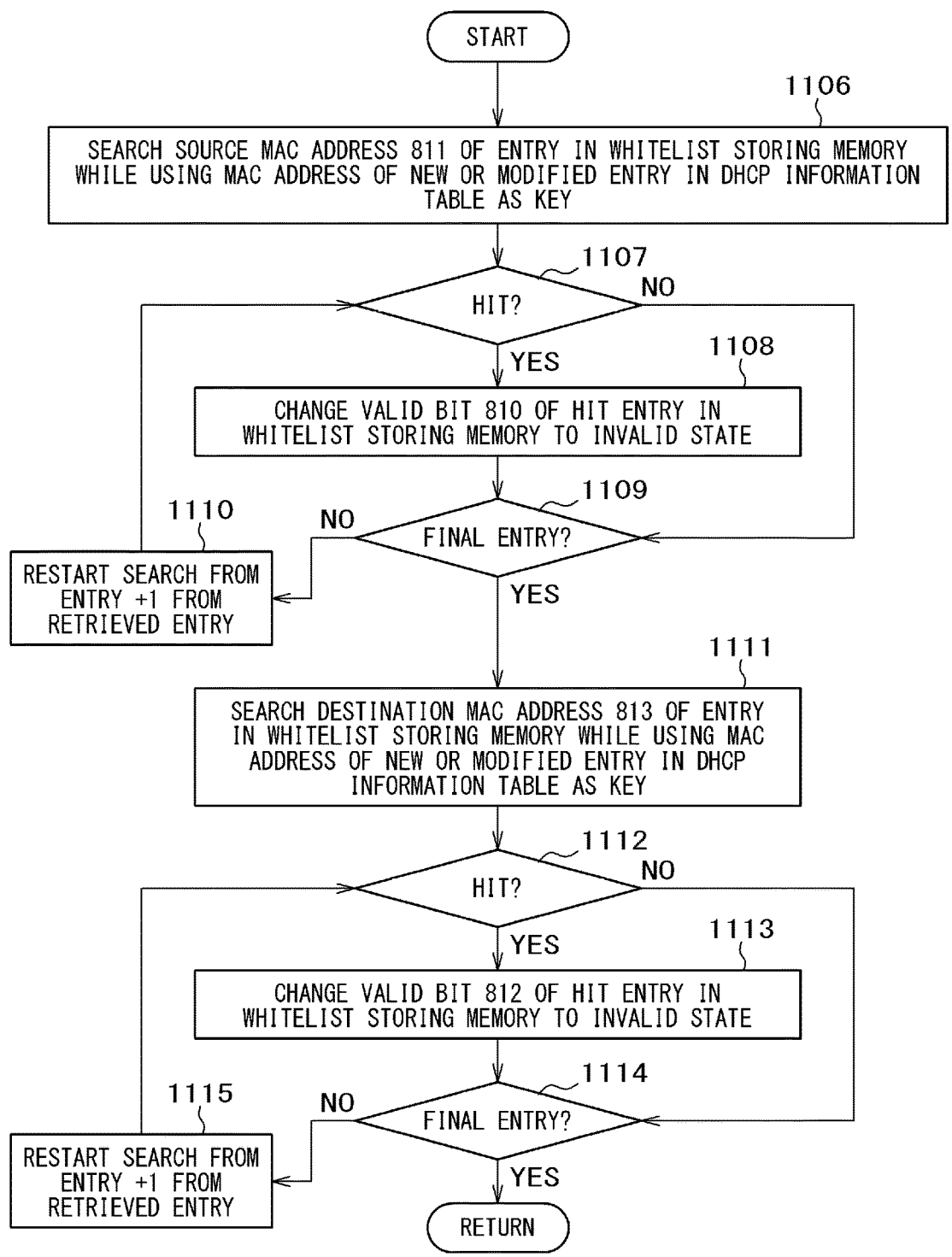

FIG. 7-1 is a flowchart of the operation according to the embodiment in receiving a DHCP RELEASE packet at the packet transfer unit 300 of the packet relay device 100. In Step 1101, the transfer destination determining unit 320 extracts the MAC address of the DHCP client 700 stored as information in the DHCP RELEASE packet. After extracting the information, in Step 1102, the transfer destination determining unit 320 transmits the extracted information (e.g. DHCP information) to the DHCP information change reflection program 423.

FIG. 7-2 is a flowchart of the operation according to the embodiment in which the DHCP information change reflection program 423 of the packet relay device 100 receives the DHCP information from the packet transfer unit 300 to remove information in the DHCP information table. In Step 1103, the DHCP information change reflection program 423 searches the DHCP information table 424, while using the MAC address of the DHCP client 700 as a key. In Step 1104, in the case where the DHCP information change reflection program 424 retrieves a hit entry as a search result, the process goes to Step 1105. The DHCP information change reflection program 424 removes the hit entry from the DHCP information table 424, and the process goes to Step 1106.

In the case where the DHCP information change reflection program 423 retrieves no hit entry in Step 1104, this means that information about the MAC address is absent in the DHCP information table 424, and the DHCP information change reflection program 423 ends the process without the removal process.

FIG. 7-3 is a flowchart of the operation according to the embodiment in which the DHCP information change reflection program 423 of the packet relay device 100 receives the DHCP information from the packet transfer unit 300, and rewrite whitelist information in the whitelist storing memory 310. In Step 1106, the DHCP information change reflection program 423 searches the whitelist storing memory 310 for an entry having a value matched with the value in the Source MAC Address 811 field, while using the MAC address of the DHCP client 700 as a key. In Step 1107, in the case where the DHCP information change reflection program 423 retrieves a hit entry from the entries that have been searched for, the process goes to Step 1108. The DHCP information change reflection program 423 stores a value indicating being invalid in the Valid bit 810 field, and the process goes to Step 1109. Also in the case of retrieving no hit entry in Step 1107, the process goes to Step 1109. In Step 1109, the DHCP information change reflection program 423 determines whether the entry retrieved in Step 1107 is the final entry in the whitelist storing memory 310. In the case where the DHCP information change reflection program 423 determines that the retrieved entry is not the final entry in Step 1109, the process goes to Step 1110. The DHCP information change reflection program 423 searches the whitelist storing memory 310 from the subsequent entry, and the process returns to Step 1107. In the case where the retrieved entry is the final entry in Step 1109, this means that the DHCP information change reflection program 423 has finished its searches on all the entries in the whitelist storing memory 310, and the process goes to Step 1111.

In Step 1111, the DHCP information change reflection program 423 searches the whitelist storing memory 310 for an entry having a value matched with the value in the Destination MAC Address 813 field, while using the MAC address of the DHCP client 700 as a key. In Step 1112, in the case where the DHCP information change reflection program 423 retrieves a hit entry from the entries that have been searched for, the process goes to Step 1113. The DHCP information change reflection program 423 stores a value indicating being invalid in the Valid bit 812 field, and the process goes to Step 1114. Also in the case of retrieving no hit entry in Step 1112, the process goes to Step 1114. In Step 1114, the DHCP information change reflection program 423 determines whether the entry retrieved in Step 1112 is the final entry in the whitelist storing memory 310. In the case where the DHCP information change reflection program 423 determines that the retrieved entry is not the final entry in Step 1114, the process goes to Step 1115. The DHCP information change reflection program 423 searches the whitelist storing memory 310 from the subsequent entry, and the process returns to Step 1112. In the case where the retrieved entry is the final entry in Step 1114, this means that the DHCP information change reflection program 423 has finished its searches on all the entries in the whitelist storing memory 310, and the DHCP information change reflection program 423 ends the modifying process.

The DHCP information change reflection program 423 repeats Steps 1108 and 1113 to invalidate the whitelist related to the MAC address of the DHCP client 700 for keeping the latest state of the whitelist in the case where the IP address of the DHCP client 700 is released.

Note that the DHCP information change reflection program 423 constantly monitors the DHCP information table 424. Also in the case where the lease timer of an entry in the DHCP information table 424 expires to zero, the DHCP information change reflection program 423 performs the operation in Step 1105 and later steps using MAC address information stored on the entry.

In the case where the transfer destination determining unit 320 receives a DHCP packet from the packet transmitter-receiver 200 and the packet type of the DHCP packet is neither the DHCP ACK packet nor the DHCP RELEASE packet described above, the transfer destination determining unit 320 performs the relay operation performed by a typical packet relay device without searching the whitelist storing memory 310.

FIG. 8 illustrates an exemplary instruction involved in inputs of transfer settings accepted from the input-output device 510 at the transfer setting program 422. The instruction about the transfer settings includes an instruction type 1201 to indicate the type of instruction, a set content 1202 to indicate the set content based on the instruction indicated by the instruction type 1201, and an initial state 1203 to indicate the initial state of the set content 1202, for example.

The instruction described in a record 1204 is an instruction that changes the transfer settings described in the record 504. The instruction type 1201, the set content 1202, and the initial state 1203 in the record 1204 correspond to the stored information 501, the stored content 502, and the initial state 503 in the record 504.

Note that in the case where the transfer setting program 422 accepts an instruction to change the whitelist generating state to the whitelist operating state from the input-output device 510, the transfer setting program 422 acknowledges the receipt of the instruction to the DHCP information change reflection program 423. After receiving the acknowledgement, the DHCP information change reflection program 423 repeats Step 1007 and later steps in FIG. 6-3 for all the entries stored on the DHCP information table 424 using MAC address information and IP address information stored on the entries. Performing the operation above modifies a conflict between the entries in the case where DHCP changes the IP address corresponding to the MAC address stored in packet information about a packet while the whitelist generating program 421 receives the packet information from the transfer destination determining unit 320, generates whitelist information, and finishes writing the whitelist information on the whitelist storing memory 310 in the whitelist generating state.

The instruction involved in the transfer settings inputted from the input-output device 510 to the transfer setting program 422 is an example. A configuration may be provided in which information is added to, modified on, or removed from the DHCP information table 424, for example. Regarding the addition and the modification of information in the DHCP information table 424, a MAC address, an IP address, and a lease timer, which are desired to be added or modified, are inputted through the input-output device 510. The transfer setting program 422 accepts the instruction, and transmits the input information to the DHCP information change reflection program 423. The DHCP information change reflection program 423 receives the input information, and performs the process from Step 1003 in FIG. 6-2 based on the input information above. In the case of the removal of information, a MAC address desired to be removed is inputted through the input-output device 510. The transfer setting program 422 accepts the instruction, and transmits the input information to the DHCP information change reflection program 423. The DHCP information change reflection program 423 receives the input information, and performs the process from Step 1103 in FIG. 7-2 based on the information provided from the instruction.

Note that in the description above, the case of using DHCP is described as an example. In DHCP, a server receives an address allocation request from a client, for example, and then the server can dynamically allocate an IP address to the client. An embodiment of the present invention uses various protocols that dynamically allocate IP addresses, but not limited to DHCP.

What is claimed is:

1. A communication device comprising:
a protocol information table configured to store a MAC address, an IP address, and expiration time of the IP address in corresponding relation to one another;
a whitelist storing memory configured to store a whitelist including a MAC address and an IP address; and
a processing unit,
wherein the processing unit extracts a client MAC address, a client IP address, and client expiration time of the client IP address from a communication content for establishing or for connecting communications between a server and a client in accordance with a protocol to dynamically allocate an IP address,
when searching the protocol information table for a MAC address based on the client MAC address to retrieve an entry, the processing unit updates an IP address and expiration time in the retrieved entry with the client IP address and the client expiration time, and when retrieving no entry, generates a new entry including the client MAC address, the client IP address, and the client expiration time, and
the processing unit searches the whitelist storing memory for a MAC address based on the client MAC address, and updates an IP address in a retrieved entry with the client IP address,
wherein the whitelist includes a source IP address, a destination IP address, a source MAC address, a destination MAC address, a source valid/invalid bit to control transfer or discard of a packet, and a destination valid/invalid bit to control transfer or discard of a packet,
wherein the processing unit searches the whitelist storing memory while using the client MAC address as a key, and
wherein the processing unit modifies a source IP address of an entry having a source MAC address matched with the client MAC address to the client IP address to validate a source valid/invalid bit, and modifies a destination IP address of an entry having a destination MAC address matched with the client MAC address to the client IP address to validate a destination valid/invalid bit.

2. The communication device according to claim 1,
wherein when accepting from an input-output device an instruction to change a whitelist generating state to a whitelist operating state, the processing unit searches the whitelist storing memory with MAC address information and IP address information stored on entries stored on the protocol information table, while using the MAC address information as a key, and
the processing unit modifies a source IP address of an entry having a source MAC address matched with the MAC address information to the IP address information to validate a source valid/invalid bit, and modifies a destination IP address of an entry having a destination MAC address matched with the MAC address information to the IP address information to validate a destination valid/invalid bit.

3. The communication device according to claim 1,
wherein when receiving an input of MAC address information, IP address information, and expiration time information to be added or modified from an input-output device, the processing unit searches the protocol information table for a MAC address based on the MAC address information to retrieve an entry, and updates an IP address and expiration time in the retrieved entry with the IP address information and the expiration time information, and when retrieving no entry, generates a new entry including the MAC address information, the IP address information, and the expiration time information, and
the processing unit modifies a source IP address of an entry having a source MAC address matched with the MAC address information to the IP address information to validate a source valid/invalid bit valid, and modifies a destination IP address of an entry having a destination MAC address matched with the MAC address information to the IP address information to validate a destination valid/invalid bit.

4. The communication device according to claim 1,
wherein the processing unit makes reference to the whitelist storing memory in an operating state;
when the source valid/invalid bit and the destination valid/invalid bit are valid, the processing unit transfers a received packet; and
when the source valid/invalid bit or the destination valid/invalid bit is invalid, the processing unit discards a received packet.

5. A communication device comprising:
a protocol information table configured to store a MAC address, an IP address, and expiration time of the IP address in corresponding relation to one another;
a whitelist storing memory configured to store a whitelist including a MAC address and an IP address; and
a processing unit,
wherein the processing unit extracts a client MAC address, a client IP address, and client expiration time of the client IP address from a communication content for establishing or for connecting communications between a server and a client in accordance with a protocol to dynamically allocate an IP address,
when searching the protocol information table for a MAC address based on the client MAC address to retrieve an entry, the processing unit updates an IP address and expiration time in the retrieved entry with the client IP address and the client expiration time, and when retrieving no entry, generates a new entry including the client MAC address, the client IP address, and the client expiration time, and the processing unit searches the whitelist storing memory for a MAC address based on the client MAC address, and updates an IP address in a retrieved entry with the client IP address, wherein whitelist includes a source IP address, a destination IP address, a source MAC address, a destination MAC address, a source valid/invalid bit to control transfer or discard of a packet, and a destination valid/invalid bit to control transfer or discard of a packet, wherein the processing unit extracts a client MAC address from a communication content for releasing or for disconnecting communications between the server and the client in accordance with the protocol to dynamically allocate an IP address, wherein the processing unit searches the protocol information table for a MAC address based on the client MAC address, and removes a retrieved entry, wherein the processing unit searches the whitelist storing memory while using the client MAC address as a key, and wherein the processing unit invalidates a source valid/invalid bit of an entry having a source MAC address marched with the client MAC address, and invalidates a destination valid/invalid bit of an entry having a destination MAC address matched with the client MAC address.

6. The communication device according to claim 5, wherein processing unit removes an entry having zero expiration time in the protocol information table, the processing unit searches the whitelist storing memory while using a MAC address of the removed entry as a key, and the processing unit invalidates a source valid/invalid bit of an entry having a source MAC address matched with the MAC address of the removed entry, and invalidates a destination valid/invalid bit of an entry having a destination MAC address matched with the MAC address of the removed entry.

7. The communication device according to claim 5, wherein when receiving an input of MAC address information to be removed from an input-output device, the processing unit searches the protocol information table for a MAC address based on the MAC address information and removes a retrieved entry, the processing unit searches the whitelist storing memory while using the MAC address information as a key, and the processing unit invalidates a source valid/invalid bit of an entry having a source MAC address matched with the MAC address information, and invalidates a destination valid/invalid bit of an entry having a destination MAC address matched with the MAC address information.

8. A communication system comprising:
a communication device; and
a server configured to dynamically allocate an IP address to a client,
wherein communication device includes
a protocol information table configured to store a MAC address, an IP address, and expiration time of the IP address in corresponding relation to one another,
a whitelist storing memory configured to store a whitelist including a MAC address and an IP address, and
a processing unit, the processing unit extracts a client MAC address, a client IP address, and client expiration time of the client IP address from a communication content for establishing or for connecting communications between a server and a client in accordance with a protocol to dynamically allocate an IP address, when searching the protocol information table for a MAC address based on the client MAC address to retrieve an entry, the processing unit updates an IP address and expiration time in the retrieved entry with the client IP address and the client expiration time, and when retrieving no entry, generates a new entry including the client MAC address, the client IP address, and the client expiration time, and the processing unit searches the whitelist storing memory for a MAC address based on the client MAC address, and updates an IP address in a retrieved entry with the client IP address, wherein whitelist includes a source IP address, a destination IP address, a source MAC address, a destination MAC address, a source valid/invalid bit to control transfer or discard of a packet, and a destination valid/invalid bit to control transfer or discard of a packet, wherein the processing unit extracts a client MAC address from a communication content for releasing or for disconnecting communications between the server and the client in accordance with the protocol to dynamically allocate an IP address, wherein the processing unit searches the protocol information table for a MAC address based on the client MAC address, and removes a retrieved entry, wherein the processing unit searches the whitelist storing memory while using the client MAC address as a key, and wherein the processing unit invalidates a source valid/invalid bit of an entry having a source MAC address marched with the client MAC address, and invalidates a destination valid/invalid bit of an entry having a destination MAC address matched with the client MAC address.

* * * * *